United States Patent
Asman et al.

(10) Patent No.: US 6,886,934 B2
(45) Date of Patent: May 3, 2005

(54) EYEGLASS FRAME HAVING FLEXIBLE TEMPLES

(75) Inventors: Steven Asman, Searingtown, NY (US); Tatsuro Kimura, Otsu (JP); Carey Gordon, Dallas, TX (US)

(73) Assignee: Innoventions Enterprises Ltd., Farmingdale, NY (US)

( * ) Notice: Subject to any disclaimer, the term of this patent is extended or adjusted under 35 U.S.C. 154(b) by 0 days.

(21) Appl. No.: 10/417,294

(22) Filed: Apr. 16, 2003

(65) Prior Publication Data

US 2004/0207804 A1 Oct. 21, 2004

(51) Int. Cl.$^7$ ................................................ G02C 5/14
(52) U.S. Cl. ........................................ 351/112; 351/114
(58) Field of Search ............................ 351/111–114, 122

(56) References Cited

U.S. PATENT DOCUMENTS

| | | |
|---|---|---|
| 1,705,229 A | 3/1929 | Welsh |
| 1,743,796 A | 1/1930 | Nelson |
| 1,779,015 A | 10/1930 | Schmitt |
| 1,979,855 A | 11/1934 | Belgard |
| 3,582,194 A | 6/1971 | Liautaud |
| 3,605,116 A | 9/1971 | Simpson et al. |
| 3,944,344 A | 3/1976 | Wichers |
| 4,026,640 A | 5/1977 | Everburg |
| 4,904,075 A | 2/1990 | Blumenthal |
| 4,963,013 A | 10/1990 | Bononi |
| D353,152 S | 12/1994 | Dweck et al. |
| 5,673,095 A | 9/1997 | Conway |
| 5,828,436 A | 10/1998 | Lester |
| 5,936,699 A | 8/1999 | Wang |
| 6,000,797 A | 12/1999 | Ichihashi et al. |
| 6,017,120 A | 1/2000 | McCormick |
| 6,045,221 A | 4/2000 | Resendez, Sr. |
| 6,343,859 B1 | 2/2002 | McCormick |
| 6,543,895 B2 * | 4/2003 | Fukai .......................... 351/112 |
| 2002/0149738 A1 | 10/2002 | McCromick |

* cited by examiner

Primary Examiner—Huy Mai
(74) Attorney, Agent, or Firm—Frishauf, Holtz, Goodman & Chick, P.C.

(57) ABSTRACT

Eyeglasses having temples pivotally attached to an eyewear front and which include an elongate body having a front end connected to the eyewear front and an inner surface adapted to be positioned against a head of a wearer. The elongate body has a notch formed at least partially between the inner and outer surfaces and opening at a rear to the outer surface to form a thinned wall section between the notch and inner surface and a rearwardly facing projection between the notch and outer surface. The thinned wall section has a smaller cross-section than a remaining portion of said elongate body and providing outward flexibility to said temple. The projection has a rearwardly facing tip and is spaced from the notch to thereby define a gap adapted to receive an object to enable the temple to be clipped to a shirt pocket.

20 Claims, 3 Drawing Sheets

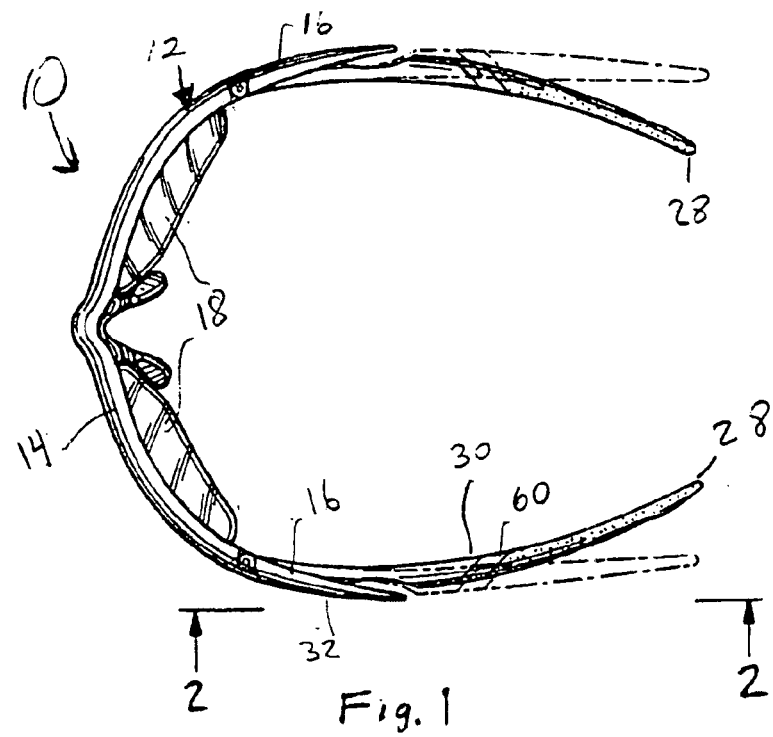
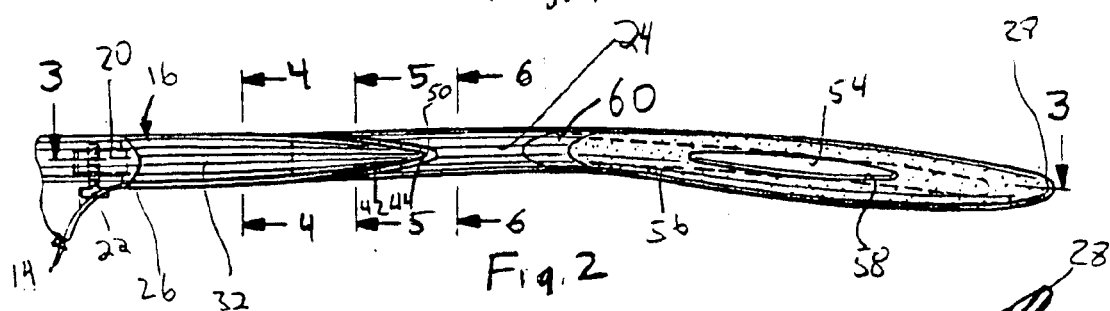
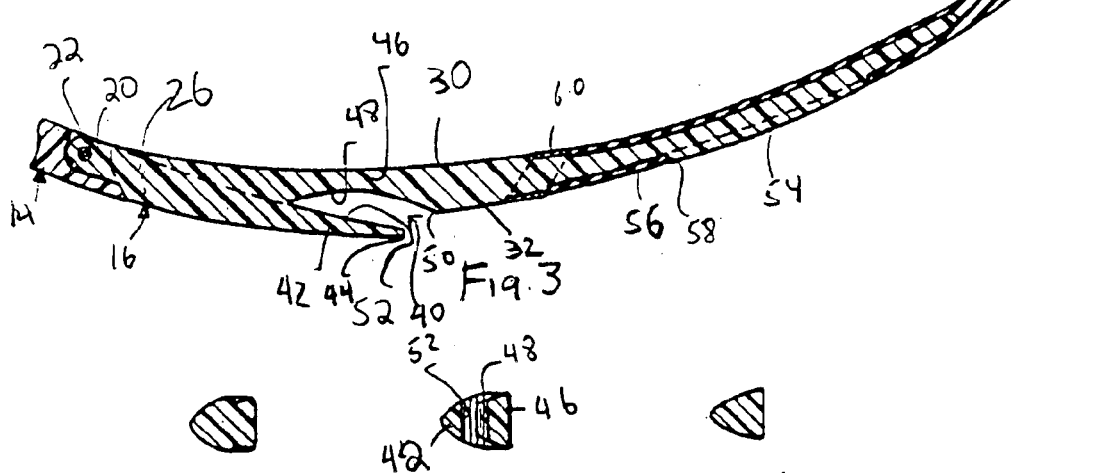

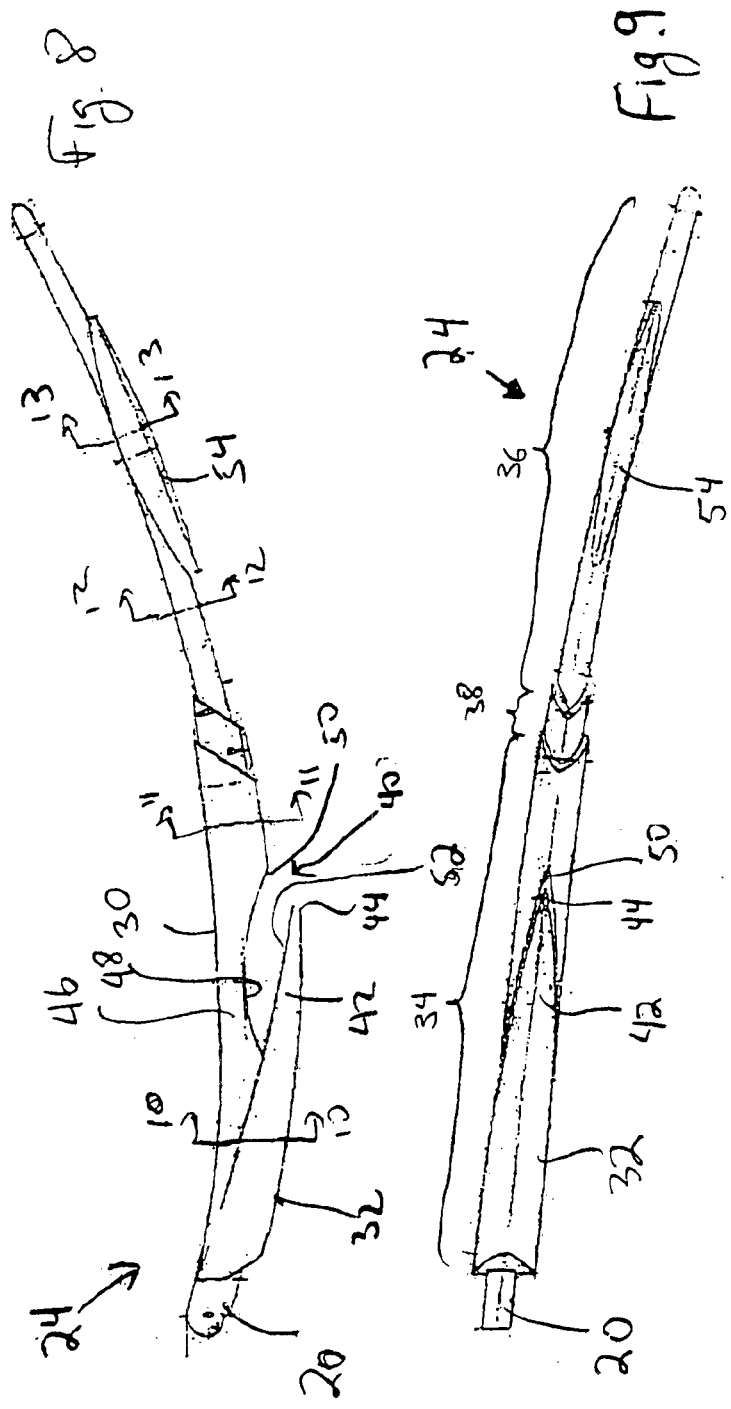

EYEGLASS FRAME HAVING FLEXIBLE TEMPLES

FIELD OF THE INVENTION

The present invention relates generally to eyeglass frames having flexible temples and more particularly to a flexible temple for eyeglass frames which includes an integral clip.

BACKGROUND OF THE INVENTION

Eyeglasses include an eyewear front defining two slots for receiving at least one lens and a pair of temples each pivotally attached at a front end to a respective side of the eyewear front. To enable the eyeglasses to be held on the wearer's head, the temples are often designed such that when the temples are in the open head receiving arrangement, the distance between their unattached rear ends is less than the distance between that portion of the temples which is situated over the ears of the wearer. As such, the eyeglasses will not fall off of the wearer's head.

In view of this construction of the temples, the temples may be designed to enable their unattached rear ends to resiliently flex outward to enable them to be passed over the ears of the wearer. Thus, flexible or spring-action temples have been proposed.

One such spring-action temple is described in U.S. Pat. No. 5,673,095 (Conway) and includes a forwardly opening L-shaped notch formed partially between inner and outer side surfaces adjacent a front attached end of the temple and having an opening to the outer side surface. A forward facing finger portion is formed between the notch and the outer side surface and a thinned wall section is formed between the notch and an inner side surface. During placement of the eyeglasses, the temples are forced laterally outward from their normally open position and flex at the thinned wall section with the tip of the finger portion approaching and then contacting a front surface defining the notch. The front surface of the notch thus serves as a stop for the outward flexible movement of the temples. Upon removal of the lateral force after the eyeglasses are on the wearer's head, the temples will return to their normal position.

A drawback of the temple of Conway is that the notch does not function well to enable the eyeglasses to be clipped to a garment or other object since it is forwardly opening and placed at the front end of the temple. Thus, if clipped to a garment, the bulk of the eyeglasses would be above the clip which would likely prevent adequate securement of the eyeglasses to the garment. It is also a drawback that the thinned wall section and finger portion are susceptible to breaking upon exertion of an excessive lateral force.

Another flexible temple is described in U.S. Pat. No. 4,904,075 (Blumenthal) and includes a core, blocks arranged around the core and connecting elements located between the blocks. The blocks are movable about the connecting elements to thereby provide the temple with outward flexibility.

Another flexible temple is described in U.S. Pat. No. 4,963,013 (Bononi) and includes notches formed around the periphery of the temple and which enable the temple to bend inward and outward.

Still another flexible temple is described in U.S. Pat. No. 6,000,797 (Ichihashi et al) and includes a stretching spring member connecting a front portion of the temple to a rear portion of the temple.

The temples shown in U.S. Pat. Nos. 4,904,075, 4,963,013 and 6,000,797 do not provide flexibility by means of a notch formed between inner and outer side surfaces which is constructed to limit the outward flexing movement of the temples as well as to serve as a clip.

Another way to provide flexibility to the temples is to reduce the cross-sectional area at a portion of the temple. Eyeglasses including temples with reduced cross-sectional areas are described in U.S. Pat. No. 1,705,229 (Welsh), U.S. Pat. No. 1,743,796 (Nelson), U.S. Pat. No. 3,944,344 (Wichers) and U.S. Pat. No. 4,026,640 (Everburg). In addition, temples having notches formed on an inner, head-engaging surface to thereby create temple sections thinner than a remaining portion of the temple include U.S. Pat. No. 3,582,194 (Liautaud) and U.S. Pat. No. 5,828,436 (Lester). None of the temples recited in the above-mentioned patents provide flexibility through the formation of a notch between inner and outer side surfaces which can also serve as a clip.

Clips for eyeglasses formed in connection with temples are known in the art. For example, U.S. Pat. No. 1,779,015 (Schmidt) describes a temple with a clip formed integral therewith. The clip is formed at the front edge of the temple and extends rearward into contact with the outer surface of the temple. The temple includes a spring wire which extends along the length of the temple and into the clip and is surrounded by zylonite or another similar material. The formation of the clip does not increase the flexibility of the temples to ease their passage over the ears of the wearer.

U.S. Pat. No. 6,045,221 (Resendez, Sr.) describes a temple with a resilient clip attached thereto by rivets or screws (FIGS. 10–12). The temple includes a receiving slot formed on an outer surface and the clip fits into the receiving slot when not in use. The clip is secured in the receiving slot by the cooperation of a receptacle in the temple and a projection on the clip, which also serves to engage clothing when the temple is clipped to the clothing. The temple and clip are not formed as a single-piece. Since the clip is situated in the receiving slot when not in use, the formation of the clip is not designed to increase the flexibility of the temples to ease their passage over the ears of the wearer.

U.S. Pat. No. 6,017,120 (McCormick) and U.S. Pat. No. 6,343,859 (McCormick) describe clips for eyeglasses which are separate from the temple and attached to an outer surface of the temple by adhesive. The presence of the clip therefore does not increase the flexibility of the temples to case their passage over the ears of the wearer.

In sum, the prior art does not disclose a flexible temple which has a notch formed between inner and outer surfaces to provide the temple with limited outward flexibility while also serving conveniently as a clip.

OBJECTS AND SUMMARY OF THE INVENTION

Accordingly, it is an object of the present invention to provide a new and improved flexible temple for eyeglasses.

It is another object of the present invention to provide anew and improved temple with a notch between inner and outer surfaces which serves to increase the flexibility of the temple and forms a clip to enable the eyeglasses to be clipped to a garment or other object.

In order to achieve these objects and others, a temple for pivotal attachment to an eyewear front in accordance with the invention comprises an elongate body having opposite front and rear ends and opposite inner and outer surfaces. The front end is connected to the eyewear front and the inner surface is adapted to be positioned against a head of a wearer of the frame. The elongate body has a notch formed at least partially between the inner and outer surfaces and opening at a rear to the outer surface to thereby form a thinned wall section between the notch and the inner surface and a rearwardly facing projection between the notch and the outer surface. The thinned wall section has a smaller cross-section than a remaining portion of the elongate body and providing outward flexibility to the temple. The projection has a rearwardly facing tip and is spaced from the notch to thereby define a gap adapted to receive an object to enable the temple to be clipped to an object.

The presence of the notch enables the temple to flex about the thinned wall section, i.e., the portion of the temple rearward of the thinned wall section can flex outward relative to the portion of the temple forward of the thinned wall section, and results in the formation of the rearwardly extending projection which enables the temple to be clipped to an object such as a shirt pocket. The use of a notch in a temple providing or enabling both flexure of the temple and the ability to conveniently clip the temple has not been achieved to date.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 1 is a top plan view of a pair of eyeglasses including temples in accordance with the invention shown opened for wear;

FIG. 2 is a side elevational view taken along the line 2—2 of FIG. 1;

FIG. 3 is a cross-sectional top view taken along the line 3—3 of FIG. 2;

FIG. 4 is a cross-sectional end view taken along the line 4—4 of FIG. 2;

FIG. 5 is a cross-sectional end view taken along the line 5—5 of FIG. 2;

FIG. 6 is a cross-sectional end view taken along the line 6—6 of FIG. 2;

FIG. 8 is a top plan view of a temple in accordance with the invention;

FIG. 9 is a side elevational view of the temple in accordance with the invention;

FIG. 10 is a cross-sectional end view taken along the line 10—10 of FIG. 8;

FIG. 11 is a cross-sectional end view taken along the line 11—11 of FIG. 8;

FIG. 12 is a cross-sectional end view taken along the line 12—12 of FIG. 8; and

FIG. 13 is a cross-sectional end view taken along the line 13—13 of FIG. 8.

DETAILED DESCRIPTION OF THE PREFERRED EMBODIMENTS

Figure 7:
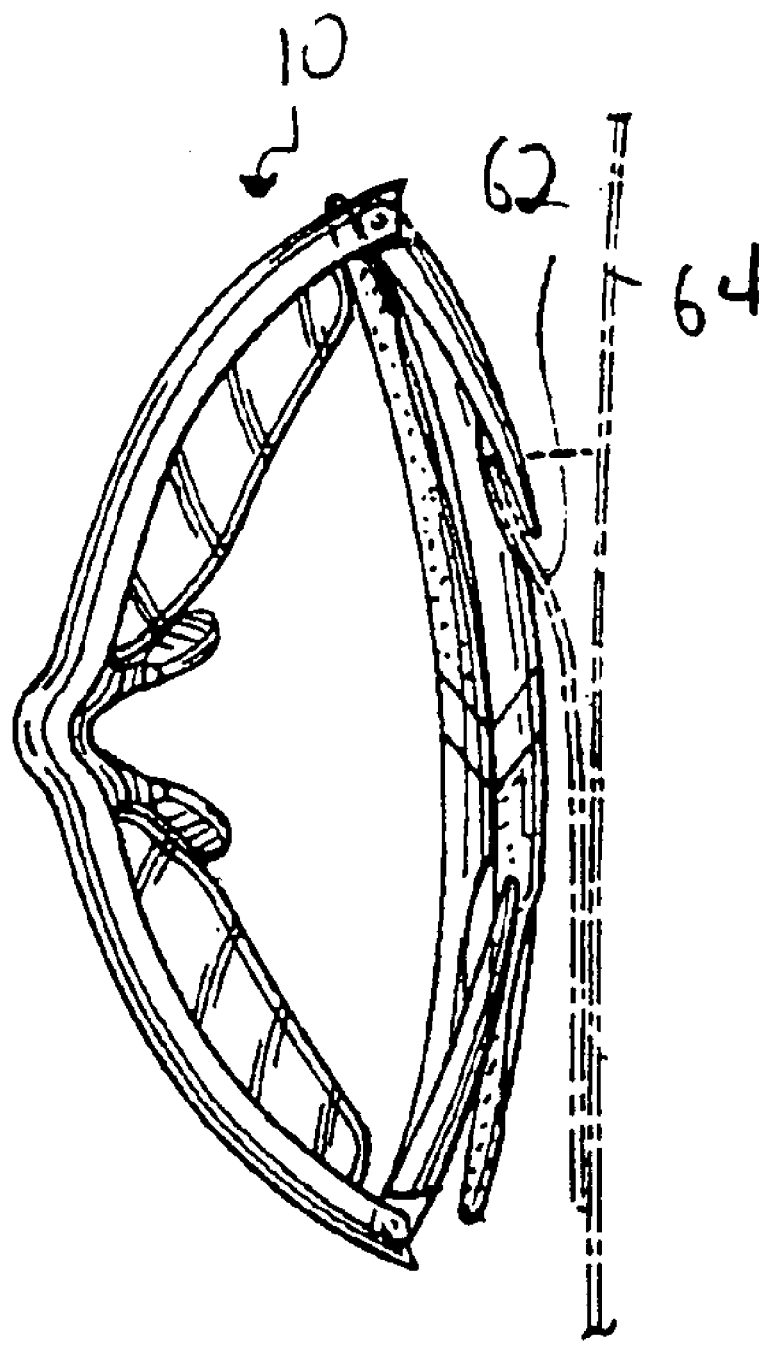
FIG. 7 is a side view of the pair of eyeglasses including temples in accordance with the invention shown clipped to a shirt pocket.

Referring to the accompanying drawings wherein like reference numbers refer to the same or similar elements, a pair of eyeglasses in accordance with the invention is designated generally at 10 and includes a frame 12 having an eyewear front 14 defining a pair of slots and a pair of temples 16 each pivotally attached to a respective edge of the eyewear front 14, and a pair of lens 18 each secured in a respective slot of the eyewear front 14. Each temple 16 includes a hinge 20 pivotally mounted in a slot in the respective edge of the eyewear front 14 by a screw 22. Other attachment mechanisms known in the art can also be used to pivotally attach the temples 16 to the eyewear front 14.

Each temple 16 has a unique structure to enable it to flex outward a limited amount when the wearer prepares to put on the eyeglasses 10 and then to revert to its original shape to fit firmly on the head of the wearer. Specifically, each temple 16 includes an elongate, arcuate body 24 and is curved inward toward the other temple 16 such that a distance between unattached rear ends 28 of the temples 16 is less than a distance between ear-engaging portions of the temples 16. As such, once placed on the wearer's head, the eyeglasses 10 will not fall off of the wearer's head.

A front end 26 of each temple 16 is pivotally attached to the eyewear front 14 via the hinge 20 and an inner surface 30 of the temples 16 is adapted to be positioned against the head of the wearer of the eyeglasses 10 when in use. As shown in FIG. 1, in one embodiment a front portion of an outer surface 32 of the temples 16 is substantially flush with the front surface of the eyewear front 14 proximate the temples 16 when the temples 16 are extended. This is however an ornamental feature and the temples 16 can be used with different eyewear fronts such that the outer surface 32 of the temples 16 are not substantially flush with the front surface of the eyewear front 14.

The arcuate body 24 has a front body portion 34 adjacent the front end 26 of the temple 16, a rear body portion 36 and an intermediate connecting portion 38 (see FIG. 9). The rear body portion 36 has a smaller cross-section than the front body portion 34. The elongate body 24 is made of a single material having a substantially uniform modulus of elasticity so that as a result, the rear body portion 36 is more flexible than the front body portion 34 and thus imparts flexibility to the temple 16.

The front body portion 34 of the elongate body 24 includes a notch 40 originating from the outer surface 32 and extending inwardly toward the inner surface 30 of the elongate body 24 and forwardly toward the front end 26 of the temple 26. A rearwardly facing projection 42 having a rearwardly facing tip 44 is thus formed between the notch 40 and the outer surface 32 and a thinned wall section 46 is formed between the notch 40 and the inner surface 30.

The formation of the thinned wall section 46, i.e., a portion of the front body portion 34 with a smaller cross-section than a remaining portion of the front body portion 34, provides outward flexibility to the temple 16 so that the rear end of the temple 16 is pivotable about the thinned wall section 46. Pivotal movement of the rear end of the temple 16 is represented by the phantom lines in FIG. 1.

As shown in FIGS. 3 and 8, the projection 42 overlies the notch 40 to form a gap or space between the tip 44 and the thinned wall section 46. The temple 16 can also be constructed such that the tip 44 overlies the outer surface 32 of the elongate body rearward of the opening of the notch 40. The eyeglasses 10 can be clipped to a garment 64 by inserting a flap, edge or pocket 62 of the garment 64 into the notch 40 as shown in FIG. 7.

In the non-limiting illustrated embodiment, the front body portion 34 has a substantially triangular shape with the inner surface 30 being planar. The projection 42 is shaped as a triangular prism which continues substantially to the front end 26 of the elongate body. The notch 40 is thus formed by an arcuate lower surface 48 having a rearward tip 50 and a planar, triangular upper surface 52 (see FIGS. 5 and 8). The arcuate lower surface 48 also constitutes an outer surface of the thinned wall section 46.

In the normal condition of the temple 16, the tip 44 does not contact the lower surface 48 forming the notch 40. That is, the gap between the tip 44 and the thinned wall section 46 is always present. Although it is possible to have the thinned wall section 46 contact the tip 44 during flexure of the temple 16 outward, the temple 16 may be constructed to prevent such flexure as it would likely cause breakage of the temple 16. The continuous presence of the gap between the tip 44 and the thinned wall section 46 which serves as a clip is in contrast to typical eyeglass clips wherein a flexible member is biased against a flat portion of the temple and thus contacts the temple when not in a clipping condition.

As noted above, the rear body portion 36 of the elongate body 24 has a smaller cross-sectional area than the front body portion 34 and thus is more flexible. Indeed, the rear body portion 36 is flexible both inward and outward about the intermediate portion 38. As shown, the rear body portion 36 has a substantially triangular shape (see FIG. 12) and includes an elongate projection 54 formed on the outer surface 32.

As shown in FIGS. 2 and 3, in one embodiment, a flexible sheath 56, made of a material which does not cause irritation to the wearer, such as soft rubber, covers the rear body portion 36. The sheath 56 includes an aperture 58 into which the projection 54 extends to thereby secure the sheath 56 to the rear body portion 36. The length of the sheath 56 is substantially the same as that of the rear body portion 36 and the size of the aperture 58 is substantially the same as that of the projection 54. Other mechanisms for securing the sheath 56 to the temple 16, and specifically the rear body portion 36 of the temple 36 can also be used in the invention.

In the embodiment shown in the figures, intermediate portion 38 of the elongate body 24 is configured to receive a metallic band or ferrule 60 for decorative purposes.

The eyeglasses 10 would be stored in a case with the temples 16 folded about the screws 22. In use, the temples 16 are extended and the eyeglasses 10 are raised to the wearer's face until the rear ends 28 of the temples 16 contact the wearer's head. As the eyeglasses 10 are forced rearward onto the wearer's head, the temples 16 are urged apart by the increasing thickness of the wearer's head and flex outward, e.g., to a position shown in dotted lines in FIG. 1. The flexure is enabled both by the flexibility of the rear body portion 36 of the elongate body 24 of the temples 16 and the flexibility of the temple 16 about the thinned wall section 46. In the latter regard, FIG. 1 shows the lower surface 48 of the notch 40 being moved closer to the tip 44. Once the eyeglasses 10 are forced sufficiently rearward past the ears of the wearer, the thickness of the head decreases and thus the force urging the temples 16 apart is removed. The temples 16 then revert to their original state. A similar outward flexure of the temples 16 and reversion to their original state may occur when the eyeglasses 10 are removed.

The lens 18 may be any conventional lens including sunglass lens. Suitable sunglass lens including those described in U.S. Pat. Nos. 4,838,673 and 6,145,984.

Further, the eyewear front 14 can be designed to enable the lens 18 to be changeable. In this case, several different lens, for example, lens having different colors, coatings and/or degrees of sun protection, would be sold with the frame 12 thereby providing the consumer with the option to use particular lens at one time and other lens at another time.

The eyewear front 14 and elongate body 24 of the temples 16 may be made of grilamid or other suitable materials known to those skilled in the art.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A temple for eyewear, comprising:

an elongate body having opposite front and rear ends and opposite inner and outer surfaces, said front end being adapted to be connected to an eyewear front and said inner surface being adapted to be positioned against a head of a wearer of the eyewear, said elongate body having a notch formed at least partially between said inner and outer surfaces and opening at a rear to said outer surface to thereby form a thinned wall section between said notch and said inner surface and a rearwardly facing projection between said notch and said outer surface, said thinned wall section having a smaller cross-section than a remaining portion of said elongate body and providing outward flexibility to said temple, said projection having a rearwardly facing tip and being spaced from said notch to thereby define a gap between said tip and said notch adapted to receive an object to enable the temple to be clipped to an object, said gap being defined in a clipped condition of the temple and in an unclipped condition of the temple.

2. The temple of claim 1, wherein said notch extends inwardly from said rear opening toward said inner surface and forwardly toward said front end.

3. The temple of claim 1, wherein said elongate body has a front body portion adjacent said front end and a rear body portion adjacent said rear end, said rear body portion having a smaller cross-section than said front body portion such that said rear body portion is more flexible than said front body portion.

4. The temple of claim 3, further comprising a flexible sheath covering said rear body portion.

5. The temple of claim 4, wherein said rear body portion includes a projection formed on said outer surface, said sheath including an aperture receivable of said projection.

6. The temple of claim 1, wherein said elongate body includes a front body portion adjacent said front end and having a substantially triangular cross-section.

7. The temple of claim 1, wherein said projection is shaped as a substantially triangular prism terminating in a rearwardly facing tip.

8. The temple of claim 1, wherein said projection extends from a location on said elongate body between said notch and said front end.

9. The temple of claim 1, further comprising a hinge arranged at said front end of said elongate body for enabling pivotal attachment of said elongate body to the eyewear front.

10. The temple of claim 1, wherein said tip overlies a location on said outer surface of said elongate body forward of a rearward tip of said notch.

11. An eyeglass frame, comprising:

an eyewear front defining a pair of slots for receiving lens; and a pair of temples each pivotally attached to a respective edge of said eyewear front;

each of said temples comprising an elongate body having opposite front and rear ends and opposite inner and outer surfaces, said front end being connected to said eyewear front and said inner surface being adapted to be positioned against a head of a wearer of the frame, said elongate body having a notch formed at least partially between said inner and outer surfaces and opening at a rear to said outer surface to thereby form a thinned wall section between said notch and said inner surface and a rearwardly facing projection between said notch and said outer surface, said thinned wall section having a smaller cross-section than a remaining portion of said elongate body and providing outward flexibility to said temple, said projection having a rearwardly facing tip and being spaced from said notch to thereby define a gap between said tip and said notch adapted to receive an object to enable said temple to be clipped to an object, said gap being defined in a clipped condition of said temple and in an unclipped condition of said temple.

12. The frame of claim 11, wherein said notch extends inwardly from said rear opening toward said inner surface and forwardly toward said front end.

13. The frame of claim 11, wherein said elongate body has a front body portion adjacent said front end and a rear body portion adjacent said rear end, said rear body portion having a smaller cross-section than said front body portion such that said rear body portion is more flexible than said front body portion.

14. The frame of claim 13, wherein each of said temples further comprises a flexible sheath covering said rear body portion.

15. The frame of claim 14, wherein said rear body portion includes a projection formed on said outer surface, said sheath including an aperture receivable of said projection.

16. The frame of claim 11, wherein said elongate body includes a front body portion adjacent said front end and having a substantially triangular cross-section.

17. The frame of claim 11, wherein said projection is shaped as a substantially triangular prism terminating in a rearwardly facing tip.

18. The frame of claim 11, wherein said projection extends from a location on said elongate body between said notch and said front end.

19. The frame of claim 11, further comprising means for pivotally attaching said elongate body to said eyewear front.

20. The frame of claim 11, wherein said tip overlies a location on said outer surface of said elongate body forward of a rearward tip of said notch.

* * * * *